(12) United States Patent
Harke et al.

(10) Patent No.: US 12,535,416 B2
(45) Date of Patent: Jan. 27, 2026

(54) METHOD, LIGHT MICROSCOPE AND COMPUTER PROGRAM FOR DETERMINING A REFERENCE TIME POINT

(71) Applicant: ABBERIOR INSTRUMENTS GMBH, Gottingen (DE)

(72) Inventors: Benjamin Harke, Gottingen (DE); Lars Kastrup, Gottingen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 255 days.

(21) Appl. No.: 18/197,807

(22) Filed: May 16, 2023

(65) Prior Publication Data
US 2023/0375473 A1    Nov. 23, 2023

(30) Foreign Application Priority Data

May 17, 2022 (DE) .................... 10 2022 112 378.2

(51) Int. Cl.
| | | |
|---|---|---|
| *G01N 21/64* | (2006.01) | |
| *G02B 21/00* | (2006.01) | |
| *G02B 21/06* | (2006.01) | |

(52) U.S. Cl.
CPC ..... *G01N 21/6408* (2013.01); *G01N 21/6458* (2013.01); *G02B 21/0076* (2013.01); *G02B 21/06* (2013.01)

(58) Field of Classification Search
None
See application file for complete search history.

(56) References Cited

U.S. PATENT DOCUMENTS 4,877,965 A * 10/1989 Dandliker .......... G01N 21/6408
356/318
5,909,278 A *  6/1999 Deka .................... G01J 3/4406
356/73

(Continued)

FOREIGN PATENT DOCUMENTS

| DE | 3524114 A1 | 1/1978 |
| DE | 4420572 A1 | 12/1995 |

(Continued)

OTHER PUBLICATIONS

Barry, L.P. et al., 'Autocorrelation of ultrashort pulses at 1.5 µm based on nonlinear response of silicon photodiodes', Electronics Letters, 32 (20), 1922-1923, 1996.

(Continued)

*Primary Examiner* — David P Porta
*Assistant Examiner* — Djura Malevic
(74) *Attorney, Agent, or Firm* — MOSER TABOADA

(57) ABSTRACT

The invention relates to a method for determining a reference time point ($t_0$) by means of a light microscope (1), wherein a sample (2) is illuminated by first light pulses (P1) in order to excite light-emitting entities in the sample (2), wherein a light signal generated by means of the first light pulses (P1) is detected, and wherein the reference time point ($t_0$) is determined based on the detected light signal, and wherein the light signal is detected in at least two measurements each in a first detection time window (G1), wherein a starting time point of the first detection time window (G1) is adjusted for each of the measurements. The invention further relates to a light microscope (1) and a computer program for carrying out the method.

19 Claims, 3 Drawing Sheets

(56) References Cited

U.S. PATENT DOCUMENTS

| | | | | |
|---|---|---|---|---|
| 6,137,584 | A * | 10/2000 | Seidel | G01N 15/02 |
| | | | | 446/213 |
| 7,557,929 | B2 * | 7/2009 | Fang-Yen | G01B 9/02091 |
| | | | | 356/497 |
| 8,334,982 | B2 * | 12/2012 | Fang-Yen | G01B 9/02063 |
| | | | | 356/497 |
| 9,372,334 | B2 * | 6/2016 | Seyfried | G02B 21/16 |
| 9,528,817 | B2 * | 12/2016 | Fang-Yen | G01B 9/02083 |
| 9,851,303 | B2 * | 12/2017 | Huber | G01N 21/6456 |
| 9,952,155 | B2 * | 4/2018 | Foelling | G02B 21/06 |
| 10,795,140 | B2 * | 10/2020 | Schoenle | H04N 23/56 |
| 11,592,393 | B2 * | 2/2023 | Bowman | G01S 17/894 |
| 11,852,474 | B2 * | 12/2023 | Vakoc | G01B 9/02008 |
| 12,111,455 | B2 * | 10/2024 | Schmidt | G02B 21/244 |
| 2002/0028399 | A1 * | 3/2002 | Nakasuji | H01L 21/6719 |
| | | | | 430/30 |
| 2003/0103662 | A1 * | 6/2003 | Finkbeiner | G01N 21/253 |
| | | | | 382/128 |
| 2005/0057736 | A1 * | 3/2005 | Tani | G03B 27/52 |
| | | | | 355/55 |
| 2005/0057756 | A1 * | 3/2005 | Fang-Yen | G01B 9/02057 |
| | | | | 356/497 |
| 2005/0105097 | A1 * | 5/2005 | Fang-Yen | G01B 9/02063 |
| | | | | 356/497 |
| 2011/0044910 | A1 * | 2/2011 | Lin | A61B 5/0068 |
| | | | | 424/9.6 |
| 2015/0022635 | A1 * | 1/2015 | Mankowski | H04N 23/74 |
| | | | | 348/46 |
| 2017/0146458 | A1 * | 5/2017 | Huber | H01S 3/302 |
| 2017/0248778 | A1 * | 8/2017 | Schoenle | G02B 21/0084 |
| 2020/0129519 | A1 * | 4/2020 | Yauch | A61P 43/00 |
| 2021/0318111 | A1 * | 10/2021 | Vakoc | G01B 9/02091 |
| 2022/0011559 | A1 * | 1/2022 | Schmidt | G02B 21/008 |
| 2022/0113244 | A1 * | 4/2022 | Langhammer | G01N 15/1484 |
| 2023/0063660 | A1 * | 3/2023 | Fahrbach | G02B 21/365 |
| 2023/0375473 | A1 * | 11/2023 | Harke | G02B 21/06 |
| 2024/0170993 | A1 * | 5/2024 | Tanemura | H01M 10/0525 |

FOREIGN PATENT DOCUMENTS

| | | | |
|---|---|---|---|
| DE | 10 2012 100 098 A1 | 7/2013 | |
| DE | 10 2014 220 547 A1 | 7/2015 | |
| DE | 102019108696 B3 * | 8/2020 | G02B 21/0032 |
| DE | 10 2020 117 043 B3 | 12/2021 | |
| WO | WO 2015/022635 A1 | 2/2015 | |

OTHER PUBLICATIONS

Hage CH et al., "Direct temporal reconstruction of picosecond pulse by cross-correlation in semiconductor device" Electronics Letters 48(13), 778-780, 2012.

Kaushalya et al., "Measuring ultra-short pulse widths before and after the objective with a home built autocorrelator," arXiv 2021 doi: 10.48550/ARXIV.2112.00353.

Youngchan Kim et al., 'Measuring two-photon microscopy ultrafast laser pulse duration at the sample plane using time-correlated single-photon counting,' J. Biomed. Opt. 25 (1) 014516, 2020.

J. R. Moffitt et al., "Time-gating improves the spatial resolution of STED microscopy," Opt. Express 19, 4242-4254 (2011).

Shin SI et al., "Simple Autocorrelation Measurement by Using a GaP Photoconductive Detector," J. Opt. Soc. Korea 20, 435-440 (2016).

G. Vicidomini et al., "Sharper low-power STED nanoscopy by time gating", Nat Methods 8, 571-573 (2011). https://doi.org/10.1038/nmeth.1624.

Wolleschensky R. et al., "Characterization and optimization of a laser-scanning microscope in the femtosecond regime"; Applied Physics B: Lasers and Optics 67(1), 87-94, 1998.

* cited by examiner

METHOD, LIGHT MICROSCOPE AND COMPUTER PROGRAM FOR DETERMINING A REFERENCE TIME POINT

CROSS-REFERENCE TO RELATED APPLICATIONS

The present application claims the benefit of and priority to German Patent Application DE 10 2022 112 378.2, filed May 17, 2022, the entire contents of which is incorporated herein by reference.

TECHNICAL FIELD OF THE INVENTION

The invention relates to a method for determining a reference time point, the method being performed by a light microscope, an light microscope, and a computer program for performing the method.

PRIOR ART

In light microscopy, particularly in fluorescence microscopy, pulsed illumination of the sample is used for various purposes, such as fluorescence lifetime analysis, multicolor pulsed microscopy (so-called pulse interleaved microscopy), confocal microscopy, and STED (stimulated emission depletion) or RESOLFT (reversible saturable optical linear fluorescence transitions) microscopy.

In STED and RESOLFT microscopy, an excitation light focus is typically overlaid with a donut- or bottle-beam-shaped light distribution of inhibition light or switching light that depopulates the excited state of the fluorophores except for a narrow central region of the focus, resulting in an increase in resolution to below the diffraction limit.

Light pulses can be generated, for example, with internally or externally pulsed lasers or with CW lasers in combination with a pulse picker.

For certain applications, the light pulses must be synchronized with other events. For example, in so-called pulse-interleaved microscopy, the time delay between pulses from different laser sources must be adjusted to produce a desired pulse sequence.

The resolution of pulsed STED microscopy also depends strongly on the time delay between the excitation pulses and the STED pulses. The STED pulses must occur later than the excitation pulse to ensure that the excited state of the fluorophores is sufficiently populated. However, if the STED pulse occurs too late, a significant fraction of the fluorophores will spontaneously decay even in areas around the central intensity minimum of the STED donut, resulting in suboptimal spatial resolution of the resulting image.

If a single photon detector or a so-called gated detector is used, accurate synchronization of the detector's (external or internal) clock with the excitation pulses is also required to obtain meaningful data.

In gated detection, the light from the sample is only detected or recorded in a specific time interval, while the remaining light signal can be discarded. So-called electronic gating may also be performed by time correlated single photon counting (TCSPC) modules. For this purpose, certain parts of the obtained time-resolved photon histogram are selected for further processing, while other parts are discarded.

Gated detection can be used, for example, to reduce scattered light in fluorescence microscopy (see, e.g., U.S. Pat. No. 9,372,334).

In addition, gated detection has been used in a combination of pulsed excitation lasers with continuous STED lasers in so-called CW STED microscopy (J. R. Moffitt, C. Osseforth, and J. Michaelis, "Time-gating improves the spatial resolution of STED microscopy," Opt. Express 19, 4242-4254 (2011); G. Vicidomini, G. Moneron, K. Han, et al. Sharper low-power STED nanoscopy by time gating. Nat Methods 8, 571-573 (2011). https://doi.org/10.1038/nmeth.1624; U.S. Pat. No. 9,952,155 B2).

Gated detection may also be used more generally to increase the resolution of STED microscopy images by lifetime separation, since spontaneously emitting fluorophores have longer lifetimes than fluorophores that are depleted by the STED pulse.

Finally, gating has been used in STED microscopy to reduce the background signal resulting from direct excitation by the STED beam (WO 2015/022635 A1).

Many microscopic applications, such as those mentioned above, require precise time coordination of light pulses to achieve high-quality results.

For non-triggered laser sources, the timing of the pulses is determined by the fixed repetition rate, while the laser pulses emitted by triggered laser sources are timed by the trigger pulses applied to the laser source.

However, the time of arrival of the laser pulses on the sample is difficult to determine and may vary between different microscope setups and during experiments, especially due to different environmental parameters. This leads to a lack of repeatability and reproducibility of certain microscopic experiments.

Various methods for measuring the time of laser pulses are known from the prior art. For example, the laser pulse can be split into two pulses, wherein the correlation function of the two partial pulses is determined with the aid of an interferometer (see e.g., Barry, L. P.; Bollond, P. G.; Dudley, J. M.; Harvey, J. D.; Leonhardt, R.: 'Autocorrelation of ultrashort pulses at 1.5 µm based on nonlinear response of silicon photodiodes', Electronics Letters, 32 (20), 1922-1923, 1996; Youngchan Kim, Steven S. Vogel, 'Measuring two-photon microscopy ultrafast laser pulse duration at the sample plane using time-correlated single-photon counting,' J. Biomed. Opt. 25 (1) 014516, 2020; Shin S I, Lim S L: "Simple Autocorrelation Measurement by Using a GaP Photoconductive Detector," J. Opt. Soc. Korea 20, 435-440 (2016); Wolleschensky R., Feurer T., Sauerbrey R., Simon U.: "Characterization and optimization of a laser-scanning microscope in the femtosecond regime"; Applied Physics B: Lasers and Optics 67(1), 87-94, 1998; Kaushalya, Fried, H: "Measuring ultra-short pulse widths before and after the objective with a home built autocorrelator," arXiv 2021 doi: 10.48550/ARXIV.2112.00353; Hage C H, Billard F, Kibler B, Finot G, Millot G: "Direct temporal reconstruction of picosecond pulse by cross-correlation in semiconductor device" Electronics Letters 48(13), 778-780, 2012).

However, these methods have the disadvantage that they are relatively complex in terms of equipment or require elaborate calibration.

Objective Problem

The present invention is therefore based on the objective of providing a simple and robust method for repeatable and reproducible determination of the time of arrival of light pulses on a sample analyzed with a light microscope.

Solution

This objective is attained by the subject matter of independent claims 1 (method), 11 (light microscope) and 12

(computer program). Advantageous embodiments are given in subclaims 2 to 10 and described below.

DESCRIPTION OF THE INVENTION

A first aspect of the invention relates to a method for determining a reference time point, wherein a sample is illuminated by first light pulses by means of a first light source of a light microscope in order to excite light-emitting entities in the sample, wherein a light signal generated by means of the first light pulses is detected by means of a detector of the light microscope, and wherein the reference time point is determined based on the detected light signal. Therein, the light signal is detected in at least two measurements in each case in a first detection time window, wherein a starting time point of the first detection time window is adjusted for each of the measurements, in particular in equal steps. In particular, a length of the first detection time window remains constant in the at least two measurements.

In particular, the reference time point indicates a time point of the first light pulses.

In particular, the light signal is generated by the first light pulses but does not necessarily have to originate from the light-emitting entities in the sample. For example, the light signal may also be reflected or scattered light from the first light pulses. In particular, the reference time point may indicate a time point at which a corresponding first light pulse is incident on the sample, e.g., relative to a clock obtained from the light source generating the first light pulses or from an external clock.

The reference time point determined based on the light signal reflects the situation in the light microscope, in particular in the sample, better than comparable methods of the prior art, in which a reference time point is estimated, e.g., from external clock pulses or information from the laser source, and is in particular less influenced by environmental fluctuations. Therefore, the method is direct and very accurate.

According to the invention, the light signal of the sample is detected in a first detection time window in several measurements, wherein a starting time point of the first detection time window is adjusted for each of the measurements, in particular in equal steps. In other words, the first detection time window is shifted in time until the detected light signal indicates the reference time point. In particular, a length of the first detection time window remains constant in the plurality of measurements.

The first detection time window is shifted in time between the different measurements. For example, the starting time point of the first detection time window in which a light signal resulting from the first light pulse was detected can be used to easily determine the reference time point. This method is much easier to implement than, for example, prior art autocorrelation methods based on interferometers.

The first detection time window defines a time interval in which the light signal is detected or recorded by a detector (e.g., a point detector such as an avalanche photodiode, a photomultiplier, or a hybrid detector, or a camera), and the light signal detected outside the time interval is not considered in determining the reference time point.

The detection of the light signal in the first detection time window can be performed in particular by blocking or attenuating the light emitted by the sample at specific times. Alternatively, so-called electronic gating can be carried out, wherein in particular individual photons of the detection light are detected by the detector, and wherein each photon is assigned a time stamp. Based on these time stamps, gating can be performed by selecting photons from specific time intervals at the data processing level.

The obtained reference time point can be used as a reference for synchronization with other events, e.g., detector control or second light pulses generated, for example, by a second light source.

As used herein, the term "light-emitting entities" refers to molecules, particles, or molecular complexes that emit light in response to the illumination light. For example, the emitted light may be produced by reflection or scattering of the illumination light, or, if the illumination light is excitation light capable of exciting the light-emitting entities, the emitted light may be luminescence light, particularly fluorescence light or phosphorescence light. The light-emitting entities may be single molecules, complexes, or aggregates of molecules or particles.

The light-emitting entity may itself emit light or contain one or more molecules that emit light in a complex, aggregate, or particle. In fluorescence microscopy, for example, the light-emitting entities may be fluorophores (small molecules or fluorescent macromolecules such as fluorescent proteins) or single molecules labeled with one or more fluorophores (e.g., proteins bound to one or more fluorophores by a chemical bond between amino acid side chains and fluorophores, or proteins bound to an antibody or similar entity, where the antibody is labeled with a fluorophore). An example of a light-reflecting particle is a gold nanoparticle. Fluorescent particles can be, for example, so-called quantum dots.

In particular, the light signal is generated by the light-emitting entities. Alternatively, the light signal may be generated by other structures associated with or separate from the sample. Examples include light reflected or scattered from a sample support, such as a microscope slide or a cover glass covering the sample. In addition, the sample may include more than one type of light-emitting entities, wherein a first type is used to obtain the light signal for determining the reference time point and a second type is used to image the sample or localize specific structures in the sample.

Similarly, it is possible for the first light pulses to be detected directly by a detector adapted for gating at a suitable position in the light microscope's beam path to obtain the light signal. The closer this position is to the position of the sample, the more accurately the light signal will reflect the actual conditions in the sample.

In certain embodiments, the sample is imaged by the light microscope or the light-emitting entities in the sample are localized by the light microscope, particularly after determining the reference time point.

Any type of light microscope can be used to perform the method. Examples include bright field microscopes, dark field microscopes, phase contrast microscopes, differential interference contrast (DIC) microscopes, fluorescence microscopes, wide field microscopes, confocal scanning microscopes, near field microscopes, far-field microscopes, light sheet microscopes, multiphoton microscopes, 4p microscopes, infrared microscopes, STED microscopes, RESOLFT microscopes, PALM/STORM microscopes, MINFLUX microscopes, or MINSTED microscopes.

In PALM (photo activated localization microscopy) or STORM (stochastic optical reconstruction) microscopy, the sample is labeled with photoswitchable or blinking fluorophores under conditions that ensure that the emission light signals from the individual emitters at a given time are at such a distance from each other that they can be distinguished from each other. A localization map of the emitters can then be reconstructed from a time series of images.

The term MINFLUX microscopy (sometimes also called MINFLUX nanoscopy, described e.g., in Balzarotti F, Eilers Y, Gwosch K C, Gynnå, A, Westphal V, Stefani F, Elf J, Hell S W "Nanometer resolution imaging and tracking of fluorescent molecules with minimal photon fluxes," Science 355 (6325), 606-611 (2016)), refers to a light microscopy technique for localizing single light-emitting entities in a sample, illuminating the sample with a light distribution comprising a local minimum at positions forming a pattern near an expected position of a single light-emitting entity, measuring emission light intensities or photon counts for each position, and determining a new position estimate based on the measured light intensities/photon counts and the corresponding positions. In particular, the light distribution with the local minimum is an excitation light distribution. Alternatively, the light distribution can be, for example, an inhibition light distribution (e.g., STED) with a local minimum, which is in particular superimposed with an excitation light distribution with a local maximum.

The term MINSTED microscopy (published, e.g., in Weber, M., Leutenegger, M., Stoldt, S. et MINSTED fluorescence localization and nanoscopy. *Nat. Photonics* 15, 361-366 (2021). https://doi.org/10.1038) describes a light microscopy method for localizing individual light-emitting entities in a sample, wherein the sample is scanned in a circular manner with an excitation light distribution that comprises a local maximum and with an inhibition light distribution (e.g., STED light) comprising a local minimum, wherein upon detection of a photon from a light-emitting entity, the center of the circle is shifted toward the location of photon detection while its radius is decreased, and an effective point spread function of the detection is narrowed until the position of the center converges with the position of a single light-emitting entity. In particular, light from the light-emitting entities is detected confocally to the center of the circle.

The first light pulses (and also the second light pulses described further below) may have any pulse length suitable for the microscopic experiment, in particular in the femtosecond, picosecond or nanosecond range. In particular, the light pulses can be generated by a triggerable or non-triggerable pulsed laser or, for example, by a continuous wave (CW) laser using a pulse selector or pulse picker.

The light signal detected by the sample to determine the reference time point may be any type of light, in particular reflected light, (RAMAN or Rayleigh) scattered light or luminescent light (i.e., fluorescence or phosphorescence). The light signal may be directly caused by the first light pulses, especially in the sample. In the case of reflected or scattered light, the light signal may be the light from the first light pulses reflected or scattered from structures in the sample. In case of luminescence light, the first light pulses may excite luminophores (e.g., fluorophores) in the sample, which emit the light signal as they decay from their excited state back to the ground state.

According to one embodiment, a maximum light signal is determined from the detected light signal, wherein the reference time point is determined based on the detection time window in which the maximum light signal was detected.

By determining the maximum light signal, the time at which the light signal occurred can be determined in a particularly simple manner.

According to a further embodiment, the first detection time window is shorter than an emission lifetime of the light-emitting entities in the sample, wherein in particular the first detection time window is shorter than 50%, further in particular shorter than 40%, still further in particular shorter than 30%, still further in particular shorter than 20%, still further in particular shorter than 10%, still further in particular shorter than 5%, still further in particular shorter than 1%, of the emission lifetime of the light-emitting entities in the sample.

This ensures that the determined reference time point is sufficiently accurate on the time scale of the emission decay of the light-emitting entities.

The emission lifetime of the light-emitting entities is a measure of how fast light is emitted from the light-emitting entities in response to the first light pulses. For example, if light emission can be described as a single exponential process, the emission lifetime is particularly defined as the reciprocal of the time constant of a single exponential decay. For an ensemble of emitters, this emission lifetime describes the time after which the light intensity of the light emission has decreased to a fraction $1/e$ of the initial intensity value. In the case of a single emitter, the emission of a photon after triggering by the light pulse follows a probability distribution that can be described, for example, by a mono exponential decay, and the emission lifetime is the time after which the probability that a given emitter has emitted a photon is equal to $1-1/e$.

According to a further embodiment, the first detection time window has a length of 500 ps or less, in particular 200 ps or less, further in particular 100 ps or less, still further in particular 50 ps or less, still further in particular 20 ps or less, still further in particular 10 ps or less, still further in particular 5 ps or less, still further in particular 1 ps or less.

If a very short detection time window is selected, the time of the light signal and thus the reference time point can be determined very precisely.

According to a further embodiment, the first detection time window is shorter than a pulse-to-pulse time interval of the first light pulses. The pulse-to-pulse time interval is the reciprocal of the pulse repetition rate and is typically in the nanosecond range for pulsed laser sources.

Setting the first detection time window to values shorter than the pulse-to-pulse time interval ensures that only the light signal caused by a single first light pulse is detected in the first detection time window.

According to a further embodiment, the first light pulses are coordinated or synchronized in time with the determined reference time point after the reference time point has been determined. This means that the first light pulses are given a defined time interval from the reference time point, wherein the interval may in particular also have the value zero.

According to a further embodiment, the light signal is detected by means of a detector, wherein light emitted from the light-emitting entities in the sample is detected by means of the same detector.

According to a further embodiment, the light signal is detected by means of a first detector, wherein light emitted by the light-emitting entities in the sample is detected by means of a separate second detector. The first detector may be, for example, a photodiode.

In particular, the light signal may be selectively directed to the first detector, e.g., by reversibly pivoting the first detector itself or mirrors into a beam path of the light microscope for forwarding the light signal. In this way, for example, the light signal may be detected only in a calibration step, while the light signal is not detected during the actual microscopic measurement.

According to a further embodiment, the detected light signal comprises reflected light. In particular, the reflected light is reflected from an object in the sample. Such an object may be, for example, an approximately spherical particle, such as a spherical nanoparticle. Such particles may have a diameter in the range of the diffraction limit of optical microscopy or below. Alternatively, the light may be reflected, in particular, from structures in contact with the sample, e.g., a sample support such as a glass slide or a cover glass.

In certain embodiments, the detected light signal is scattered light, in particular light generated by Raman scattering, especially by an object in the sample.

According to a further embodiment, an emission filter is removed from a detection beam path of the light microscope to detect the reflected or scattered light of the first light pulses, in particular by an actuator in response to a control signal. Such emission filters can be used to suppress background light when detecting emission light, such as fluorescent light. Since reflected or Rayleigh-scattered light has the same wavelength as incident light, an emission filter would block the light signal.

The use of reflected or scattered light as detection light has the advantage that the light signal is generated almost instantaneously, so that the reference time point can be determined very accurately. In addition, the reflection and scattering is independent of the type of luminescent label or similar and can therefore be used with a wide variety of samples.

According to a further embodiment, a second detection time window for a microscopic imaging of the sample or a localization of individual light-emitting entities in the sample is set based on the determined reference time point. In particular, the starting time point of the second detection time window is set based on the determined reference time point. In contrast to the first detection time window, the second detection time window is used in detecting the emission signal from the light-emitting entities in the sample. In particular, the second detection time window is longer than the first detection time window, in particular equal to or greater than the emission time of the light-emitting entities in the sample. The second detection time window can be used, for example, to reduce background signals from scattered light or direct excitation by STED light in STED microscopy or to improve spatial resolution in STED or RESOLFT microscopy, as described in the prior art.

According to a further embodiment, the sample is additionally illuminated with second light pulses. The second light pulses may comprise light with the same wavelength as the first light pulses or with a different wavelength than the first light pulses.

The reference time point indicates in particular the time of the first light pulses and/or the second light pulses.

According to a further embodiment, a time delay between the first light pulses and the second light pulses is determined based on the detected light signal, wherein the reference time point is the time for which the time delay is zero.

In certain embodiments, the second light pulses are suitable for reducing or deactivating light emission from the light-emitting entities. For example, the second light pulses may be STED pulses that deplete the excited state of the light-emitting entities. In particular, an inhibition light distribution with a local minimum at the focus may be generated from the second light pulses to deplete the excited state of the light-emitting entities in a region around the local minimum and thereby achieve a resolution below the diffraction limit. In this way, for example, the sample can be imaged by STED microscopy.

According to a further embodiment, the time delay between the first light pulses and the second light pulses is adjusted after the reference time point has been determined, in particular based on the reference time point, in order to optimize the resolution of the structures imaged in the sample.

This can be applied, for example, to determine and then adjust the time delay between excitation pulses and inhibition pulses (e.g., STED pulses). In particular, this time delay influences the effectiveness of the inhibition light (i.e., the effectiveness of depopulating the excited state) and thus the increase in resolution achieved by STED microscopy.

A second aspect of the invention relates to a light microscope configured to determine a reference time point, in particular by the method according to the first aspect. The light microscope comprises a first light source configured to illuminate a sample with first light pulses to excite light-emitting entities in the sample, at least one detector configured to detect a light signal, in particular from the sample, and a data processing device configured to determine a reference time point based on the detected light signal. According to the invention, the at least one detector or the data processing device is configured to detect the light signal in at least two measurements in a first detection time window, respectively, wherein the light microscope comprises a control device configured to adjust a starting time point of the first detection time window for each of the measurements.

According to one embodiment, the control device is configured to coordinate the first light pulses in time with the determined reference time point.

According to a further embodiment, the data processing device is configured to determine a maximum light signal from the detected light signal, wherein the reference time point is determined based on the maximum light signal.

In particular, the data processing device is configured to determine the reference time point based on the detection time window at which the maximum signal was detected.

According to a further embodiment, the light microscope comprises an emission filter configured to remove background light during detection of the light emitted by the light-emitting entities, wherein the emission filter is arranged in a detection beam path in front of the at least one detector, and wherein the light microscope comprises an actuator configured to remove the emission filter from the detection beam path when the actuator receives a control signal from a control device, in particular the above-mentioned control device. In particular, the detection beam path is separated by a beam splitter from an illumination beam path along which the first light pulses reach the sample from the first light source.

According to a further embodiment, the control device connected to the at least one detector is configured to set a second detection time window during which an emission signal from the light-emitting entities in the sample is detected by the detector or a further detector, wherein the light microscope is configured to image the sample or to localize individual light-emitting entities in the sample based on the determined reference time point.

According to a further embodiment, the light microscope comprises a second light source configured to generate second light pulses, wherein the light microscope is further configured to illuminate the sample with the second light pulses, wherein the light microscope particularly comprises a beam combiner configured to combine the light of the first light pulses and the second light pulses in a common beam path.

According to a further embodiment, the light microscope comprises a light modulator configured to generate a light distribution of the light of the second light pulses, wherein the light distribution comprises a local intensity minimum at a focus in the sample.

According to another embodiment, the data processing device is configured to determine a time delay between the first light pulses and the second light pulses based on the light signal detected by the at least one detector.

According to a further embodiment, the light microscope comprises a first control device connected to the first light source, and/or the light microscope comprises a second control device connected to the second light source, wherein the first control device is configured to determine a pulse sequence of the first light pulses, and/or wherein the second control device is configured to determine a pulse sequence of the second light pulses.

According to another embodiment, the light microscope comprises a delay unit configured to adjust the time delay between the first light pulses and the second light pulses based on the detected light signal.

According to another embodiment, the detector is configured to detect both the light signal and light emitted from the light-emitting entities in the sample.

According to another embodiment, the light microscope comprises a first detector and a separate second detector, wherein the first detector is configured to detect the light signal, and wherein the second detector is configured to detect light emitted from the light-emitting entities in the sample.

A third aspect of the invention relates to a computer program comprising program code configured to cause the light microscope according to the second aspect to perform the method according to the first aspect.

All features of the method according to the first aspect apply analogously to the light microscope according to the second aspect the computer program according to the third aspect.

Advantageous further embodiments of the invention result from the claims, the description and the drawings and the associated explanations to the drawings. The described advantages of features and/or combinations of features of the invention are merely exemplary and may have an alternative or cumulative effect.

With regard to the disclosure content (but not the scope of protection) of the original application documents and the patent, the following applies: Further features are to be taken from the drawings—in particular the relative arrangements and effective connections shown. The combination of features of different embodiments of the invention or of features of different claims is also possible in deviation from the selected back relationships of the claims and is hereby suggested. This also applies to such features which are shown in separate drawings or are mentioned in the description thereof. These features may also be combined with features of different claims. Likewise, features listed in the claims may be omitted for further embodiments of the invention, but this does not apply to the independent claims of the granted patent.

The reference signs contained in the claims do not represent a limitation of the scope of the objects protected by the claims. They merely serve the purpose of making the claims easier to understand.

DESCRIPTION OF THE DRAWINGS

Figure 1:
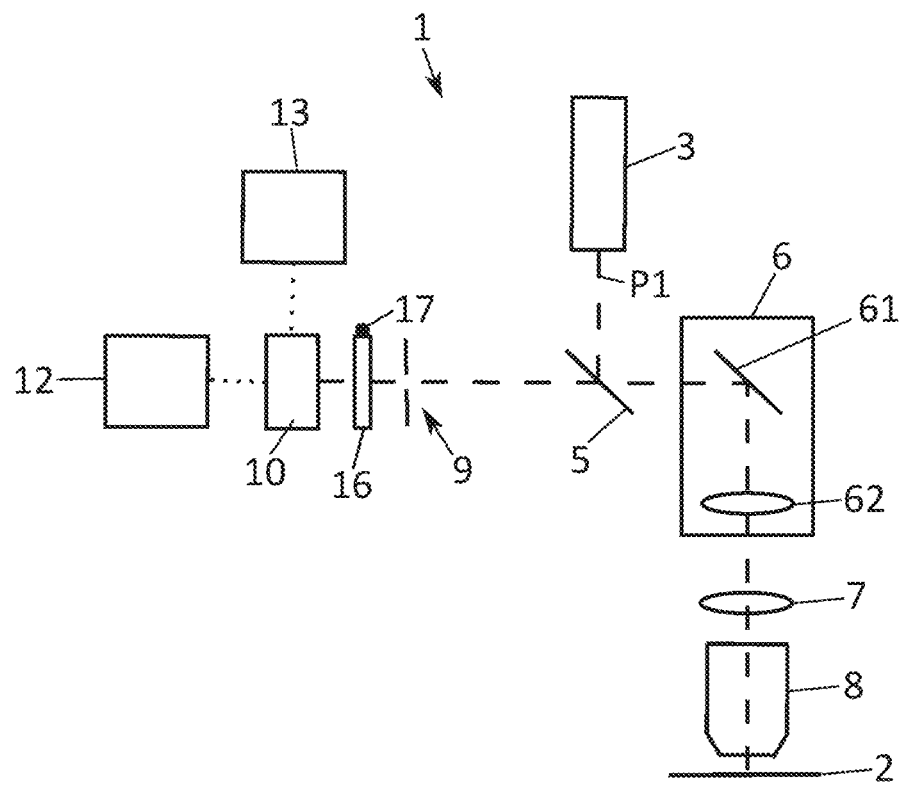
FIG. 1 shows a first embodiment of the light microscope according to the invention with a light source for generating first light pulses.

FIG. 1 shows a light microscope 1 according to the invention for microscopic analysis of a sample 2, e.g., by imaging structures in the sample 2, in particular structures marked with light-emitting entities (e.g., fluorophores), or by localizing individual light-emitting entities in the sample 2. The light microscope 1 shown in FIG. 1 is in particular a confocal scanning microscope.

The optical microscope 1 comprises a first light source 3 (e.g., a pulsed laser source) configured to generate first light pulses P1 to illuminate the sample 2. The first light pulses P1 are reflected from a dichroic mirror 5 and subsequently pass through a scanner 6 comprising one or more (typically at least two) scanning mirrors 61 and a scanning lens 62, as well as a tube lens 7, and are focused into the sample 2 by an objective 8.

Light emitting entities in the sample 2 emit light (e.g., fluorescent light) in response to the first light pulses P1. This light travels back from the sample 2 through the objective 8 and the tube lens 7, is de-scanned by the scanner 6, and is transmitted by the dichroic mirror 5 due to its wavelength.

To detect a light signal for determining the reference time point according to the embodiment shown in FIG. 1, light of the first light pulses P1 that is reflected or scattered by structures in the sample 2 may be detected by a detector 10, in particular a point detector such as an avalanche photodiode, a photomultiplier or a hybrid detector, in particular if the dichroic mirror 5 transmits a certain proportion of the reflected or scattered light. For this purpose, an emission filter 16 arranged between the detector 10 and the dichroic mirror 5 can be swung out of the beam path using an actuator 17 in a calibration step before the actual measurement. The reflected or scattered light may result, for example, from reflection or scattering of the first light pulses P1 by structures (e.g., reflective particles, such as gold beads) in the sample 2 or a structure connected to a sample carrier holding the sample 2, such as a glass carrier or a cover glass. Reflected or scattered light is advantageous because it occurs almost immediately after the first light pulses P1 hit the sample 2. Therefore, the reference time point $t_0$ can be determined very accurately when using reflected or scattered light.

Emission light emitted from light-emitting entities in the sample 2 and transmitted by the dichroic mirror 5 during a measurement step for imaging structures in the sample 2 passes through a confocal pinhole 9 and is picked up by the same detector 10.

Alternatively, the setup shown in FIG. 1 can also be used according to the invention if the light used to determine the reference time point $t_0$ is light emanating from emitters in the sample 2 (e.g., luminescence light). In this case, too, the same detector 10 may be used in a calibration step to determine the reference time point $t_0$ and in a subsequent measurement step to detect light used for microscopic imaging of structures in the sample 2 or for localizing individual emitters in the sample 2, wherein the emission filter 16 does not have to be removed from the beam path.

A data processing device 12 is coupled to the detector 10. The data processing device 12 is configured to evaluate the detected light signal. The light microscope 1 further comprises a first control device 13, which is configured to set a first detection time window G1 of the detector 10. The data processing device 12 then uses the first detection time window G1 to determine the reference time point to, for which a maximum light signal was detected by the detector 10.

The first detection time window G1 is a time interval during which the detected light is detected or recorded by the detector 10. This detection time window may be realized, for example, by blocking or attenuating the light emitted from the sample 2 at certain times so that the light reaches the detector 10 only during the specified time interval. This can be achieved, for example, by a rapidly controllable aperture, such as an acousto-optic modulator (AOM), in front of the detector 10. Alternatively, the detector 10 may continuously detect light, and the first detection time window G1 may be implemented at the data processing level. For example, the data processing device 12 may include evaluation electronics configured to detect or evaluate signals from the detector 10 only at specific time intervals. For this purpose, for example, a time-correlated single photon counting module (TCSPC) configured for so-called "electronic gating" may be used.

Figure 2:
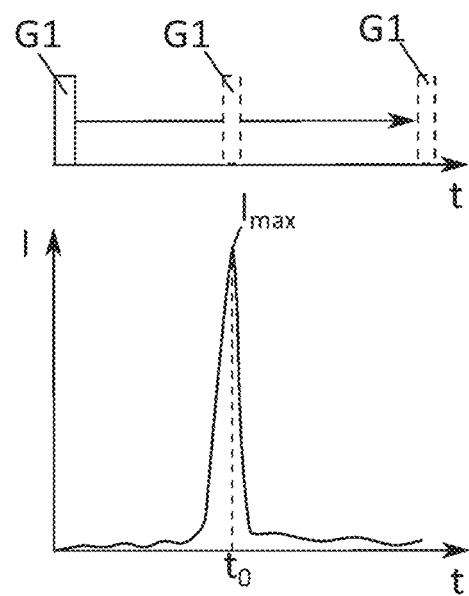
FIG. 2 shows the shifting of a first detection time window for the detection of a maximum light signal according to a first embodiment of the method according to the invention.

The upper diagram in FIG. 2 shows the time shift of the first detection time window G1, while the lower diagram in FIG. 2 plots the detected light intensity for a single first light pulse P1 against the starting time point of the first detection time window G1. By using a narrow first detection time window G1, a relatively sharp peak of the detected light with a single intensity maximum (maximum light signal $I_{max}$) is obtained. The time of the maximum light signal $_{Imax}$ is the reference time point $t_0$.

Since the first light source 3 typically emits a continuous pulse train of first light pulses P1, the detected light signal naturally also varies periodically, and observation over a longer time interval results in several profiles such as the one shown in FIG. 2 (lower graph). Therefore, to determine the reference time point to, the first detection time window G1 is shifted, in particular, by a time interval corresponding to the pulse-to-pulse time interval (reciprocal of the pulse repetition rate) of the first light pulses P1 or less.

In particular, the width of the first detection time window G1 is significantly smaller than the emission duration of the light-emitting entities in sample 2, so that the reference time point to can be determined exactly on the time scale of the emission duration.

Figure 3:
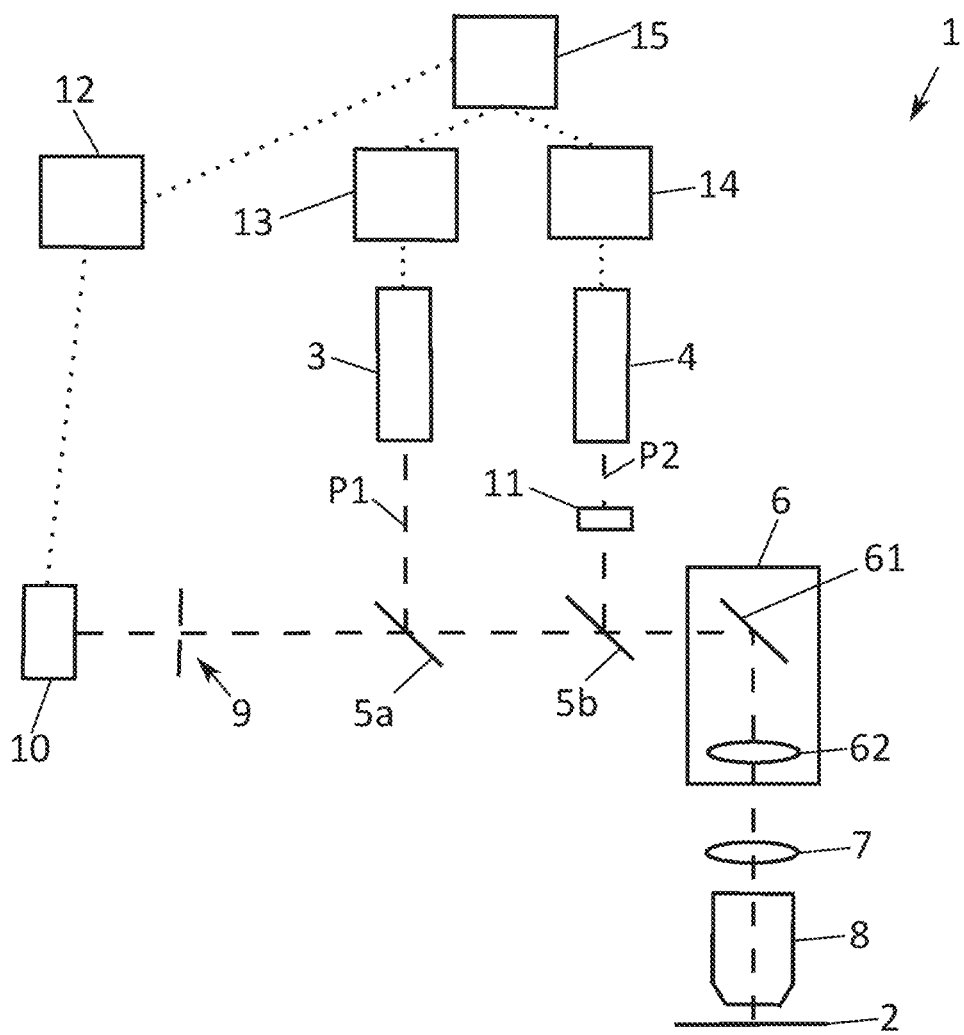
FIG. 3 shows a second embodiment of the light microscope according to the invention with a first light source and a second light source for generating first and second light pulses.

FIG. 3 shows a further embodiment of the light microscope 1 according to the invention, in particular a STED or RESOLFT microscope, comprising a first light source 3 for generating first light pulses P1 and a second light source 4 for generating second light pulses P2, wherein the light of the first light pulses P1 and of the second light pulses P2 is combined in a common beam path by means of a first dichroic mirror 5a and a second dichroic mirror 5b.

The combined light of the first and second light pulses P2 passes through a scanner 6 comprising one or more scan mirrors 61 and a scan lens 62, a tube lens 7, and is then focused on the sample 2 through a lens 8. The combined focus may be scanned over the sample by rotating the scan mirrors 61 of the scanner 6.

In particular, the first light pulses P1 comprise excitation light that excites light-emitting entities in the sample 2 so that they emit light in response to the excitation light. This emitted light travels back through the objective lens 8 and the tube lens 7, is de-scanned by the scanner 6, and is transmitted by the first dichroic mirror 5a and the second dichroic mirror 5b based on its wavelength. The emitted light then passes through a confocal pinhole 9 and is detected by a detector 10, in particular a point detector such as an avalanche photodiode, a photomultiplier or a hybrid detector.

In particular, the second light pulses P2 comprise inhibition light that depletes the excited state of the light-emitting entities in the sample 2 (e.g., by stimulated emission depletion, STED), or switching light that converts the light-emitting entities to a non-emitting dark state (e.g., a triplet state) (as known, for example, from RESOLFT microscopy).

In particular, a light modulator 11 is arranged between the second light source 4 and the second dichroic mirror 5b, which shapes the focus of the light of the second light pulses P2 in the focus to a hollow, in particular donut- or bottle-beam-shaped light distribution comprising a local minimum. Thus, the inhibition of emission or switching of the light-emitting entities occurs only in a small area around the geometric focus, resulting in a resolution below the diffraction limit. The light modulator 11 may be, for example, a programmable spatial light modulator comprising pixels (e.g., operated in diffraction or reflection mode or in transmission mode) or a phase plate comprising a retardation pattern for phase modulating the light beam formed by the second light pulses P2. For example, a so-called vortex phase pattern can be displayed to form a donut-shaped focus, and an annular phase pattern with a phase jump by the value $\pi$ can be displayed to form a bottle-beam-shaped focus.

As further shown in FIG. 3, the first light source 3 is connected to a first control device 13 which determines the pulse sequence of the first light pulses P1, and the second light source 4 is connected to a second control device 14 which determines the pulse sequence of the second light pulses P2. The first control device 13 and the second control device 14 are both connected to a delay unit 15 which sets the time delay $t_d$ between the first light pulses P1 and the second light pulses P2.

Figure 4:
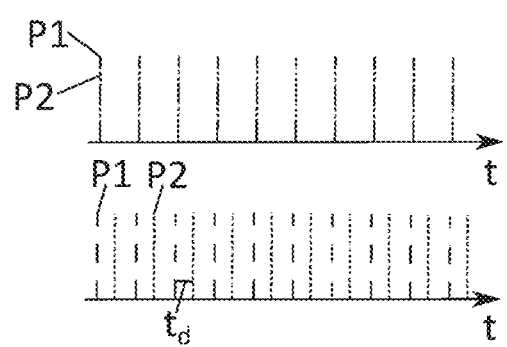
FIG. 4 schematically shows the setting of a time delay between first light pulses and second light pulses according to one embodiment of the method according to the invention.

The setting of the time delay $t_d$ between the first light pulses P1 and the second light pulses P2 according to one embodiment of the method according to the invention is shown in FIG. 4. Here, as described above, the reference time point $t_0$ is determined from the detected light signal, and the time delay $t_d$ between the first light pulses P1 and the second light pulses P2 is set by the delay unit 15 based on the reference time point $t_0$.

Therein, the time delay $t_d$ may initially be set to zero in particular, as shown in the upper diagram of FIG. 4. Subsequently, the time delay $t_d$ may be increased again, in particular to optimize an emission inhibition efficiency and thus a resulting spatial resolution of the STED microscopy.

Advantageously, the prior calibration of the first light pulses P1 and the second light pulses P2 according to the invention allows the optimized time delay $t_d$ to be set very precisely and reproducibly from experiment to experiment, resulting in accurate and reproducible imaging results.

Figure 5:
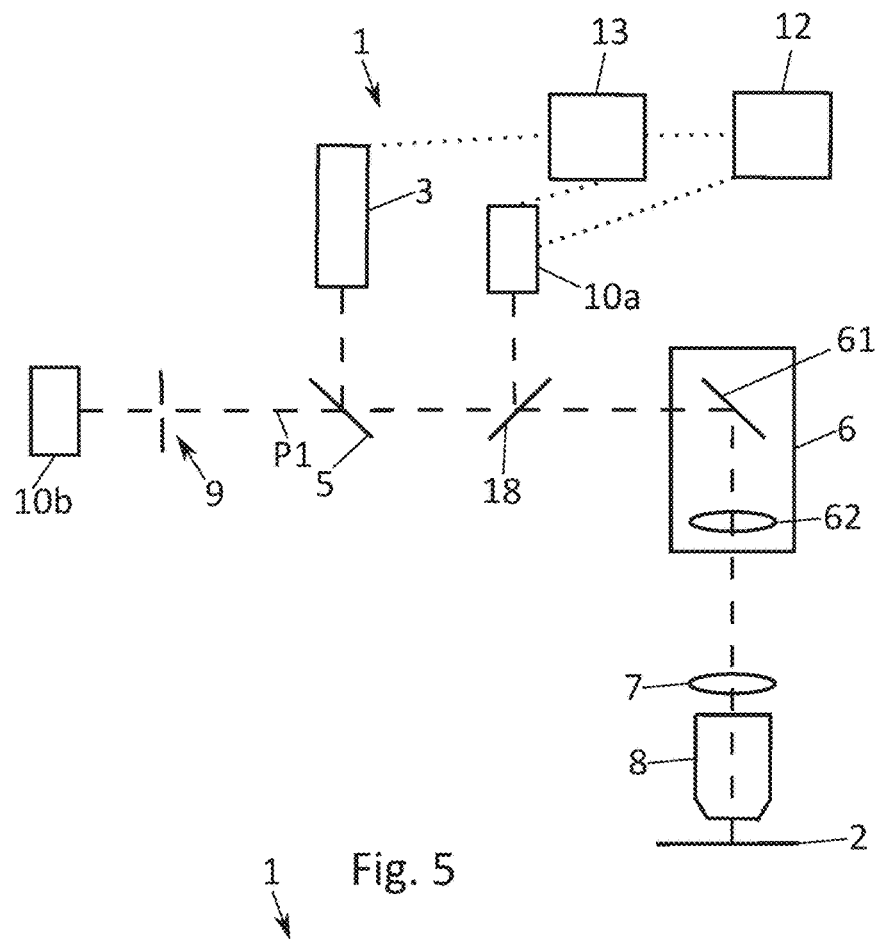
FIG. 5 shows a third embodiment of the light microscope according to the invention.
Figure 6:
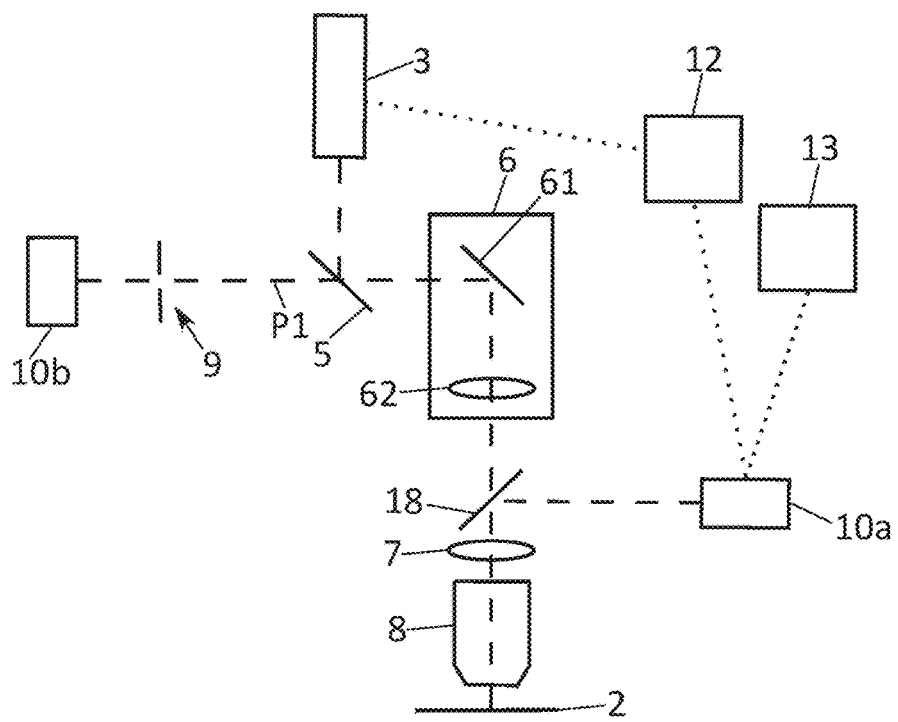
FIG. 6 shows a fourth embodiment of the light microscope according to the invention.

FIG. 5 and FIG. 6 show further embodiments of a light microscope 1 according to the invention, each with a first detector 10a for detecting the light signal for determining the reference time point $t_0$ and a second detector 10b for detecting light emanating from light-emitting entities in the sample 2, for example, in order to image structures in the sample 2 microscopically or to localize individual light-emitting entities. Components that are also included in the light microscopes 1 according to FIG. 1 and/or FIG. 2 are designated with the same reference signs as in FIG. 1 and/or FIG. 2. With regard to their mode of operation, reference is made to the description of FIG. 1 and/or FIG. 2.

The light microscope according to FIG. 5 comprises a beam splitter 18 that couples out a small portion of the light generated by the first light source 3 of the first light pulses P1 from the beam path, which is detected by the first detector 10a i to determine the reference time point $t_0$ as described further above by adjusting the first detection time window G1. The beam splitter 18 may in particular be designed as a partially transparent mirror, prism or beam sampler. The coupled-out light is focused onto the detector 10a, e.g., a photodiode, in particular by means of lenses not shown in FIG. 5.

According to the embodiment shown in FIG. 5, the beam splitter 18 is located between the dichroic mirror 5 and the scanner 6.

The light microscope 1 shown in FIG. 6 also comprises a beam splitter 18. Here, however, it is located in the beam path between the tube lens 7 and the scanner 6. In this way, scattered light emanating from the sample 2 or light reflected from the sample is detected by the first detector 10a. Again, lenses may be provided to focus the outcoupled light onto the first detector 10a. Further, a filter (not shown) may be disposed between the beam splitter 18 and the first detector 10a to prevent light (e.g., luminescent light) emanating from the light-emitting entities in the sample 2 from reaching the first detector 10a in addition to scattered or reflected light.

Because the detector 10a is located relatively close to the sample 2 in the setup shown in FIG. 6, the reference time point $t_0$ determined by means of the first detector 10a advantageously corresponds relatively precisely to the time at which the first light pulses P1 strike the sample 2.

The light microscopes 1 shown in FIG. 5 and FIG. 6 may also be combined with a second light source 4, for example in the manner shown in FIG. 3, for example to illuminate the sample 2 for STED or RESOLFT microscopy with additional depletion or switching light.

LIST OF REFERENCE SIGNS

1 Light microscope
2 Sample
3 Light source, first light source
4 Second light source
5,5a,5b Dichroic mirror
6 Scanner
7 Tube lens
8 Lens
9 Pinhole
10 Detector
11 Light modulator
12 Data processing device
13 First control device
14 Second control device
15 Delay unit
16 Emission filter
17 Actuator
18 Beam splitter
61 Scan mirror
62 Scan lens
P1 First light pulse
P2 Second light pulse
G1 First detection time window
t Time
$t_0$ Reference time point
$t_d$ Time delay
I Intensity
$I_{max}$ Maximum light signal

The invention claimed is:

1. A method for determining a reference time point, wherein a sample is illuminated by a first light source of a light microscope by first light pulses to excite light-emitting entities in the sample,
   wherein a light signal generated by the first light pulses is detected by a detector of the light microscope, wherein the light signal is generated by the light-emitting entities or by other structures associated with the sample, and wherein the reference time point is determined based on the detected light signal,
   and wherein to determine the reference time point, the light signal is detected in at least two measurements each in a first detection time window, wherein a starting time point of the first detection time window is adjusted for each of the measurements; and
   wherein a maximum light signal is determined from the detected light signal, wherein the reference time point is determined based on the first detection time window in which the maximum light signal was detected.

2. The method according to claim 1, wherein the first detection time window is shorter than an emission lifetime of the light-emitting entities in the sample.

3. The method according to claim 1, wherein the first detection time window is shorter than 10% of the emission lifetime of the light-emitting entities in the sample.

4. The method according to 1, wherein the first detection time window is shorter than an emission lifetime of the light-emitting entities in the sample.

5. The method according to 1, wherein the first detection time window is shorter than 10% of the emission lifetime of the light-emitting entities in the sample.

6. The method according to claim 1, wherein the first light pulses are coordinated in time with the reference time point after the reference time point has been determined.

7. The method according to claim 1, wherein the light signal and light emitted from the light-emitting entities in the sample are detected by the same detector.

8. The method according to claim 1, wherein the light signal is detected by a first detector and light emitted from the light emitting entities in the sample is detected by a second detector.

9. The method according to claim 1, wherein the detected light signal comprises reflected light or scattered light.

10. The method according to claim 9, wherein an emission filter is removed from a detection beam path of the light microscope to detect the reflected or scattered light of the first light pulses.

11. The method according to claim 1, wherein a second detection time window for microscopic imaging of the sample or localization of individual light-emitting entities in the sample is set based on the determined reference time point.

12. The method according to claim 11, wherein the second detection time window is equal to or greater than the emission time of the light-emitting entities in the sample.

13. The method according to claim 1, wherein the sample is additionally illuminated with second light pulses, wherein a time delay between the first light pulses and the second light pulses is determined based on the reference time point.

14. The method according to claim 13, wherein the second light pulses are adapted to reduce or deactivate the light emission of the light emitting entities, wherein the time delay between the first light pulses and the second light pulses is adjusted after determining the reference time point to optimize a resolution of structures imaged in the sample.

15. The method according to claim 1, wherein the reference time point indicates a time point at which a corresponding first light pulse is incident on the sample.

16. The method according to claim 1, wherein the sample is imaged by the light microscope or the light-emitting entities in the sample are localized by the light microscope after determining the reference time point.

17. A light microscope configured to perform the method according to claim 1.

18. A light microscope for determining a reference time point comprising:

a first light source configured to illuminate a sample with first light pulses to excite light-emitting entities in the sample, a detector configured to detect a light signal generated by the light-emitting entities or by other structures associated with the sample, and a data processing device configured to determine a reference time point based on the detected light signal, wherein the detector or the data processing device is configured to detect the light signal in at least two measurements each in a first detection time window, wherein the light microscope comprises a control device which is configured to adjust a starting time point of the first detection time window for each of the measurements to determine the reference time point; and wherein the data processing device is configured to determine a maximum light signal from the detected light signal, and to determine the reference time point based on the first detection time window in which the maximum light signal was detected.

19. A non-transitory computer readable medium for storing computer instructions for determining a reference time point that when executed by at least one processor associated with a light microscope causes the at least one processor to perform a method according to claim 1.

* * * * *